United States Patent [19]

Pocknell

[11] Patent Number: 4,719,243

[45] Date of Patent: Jan. 12, 1988

[54] ORGANOSILOXANE FOAMS

[75] Inventor: David Pocknell, Antibes, France

[73] Assignee: Dow Corning France S.A., Valbonne, France

[21] Appl. No.: 928,939

[22] Filed: Nov. 10, 1986

[30] Foreign Application Priority Data

Nov. 12, 1985 [FR] France .................. 85 16653

[51] Int. Cl.$^4$ ............................. C08J 9/00
[52] U.S. Cl. ........................ 521/91; 521/122; 521/127; 521/154; 528/18; 528/31; 528/901
[58] Field of Search .............. 521/154, 91, 122, 127; 528/18, 31, 901

[56] References Cited

U.S. PATENT DOCUMENTS

| | | | |
|---|---|---|---|
| 2,875,163 | 2/1959 | Berridge | 260/2.5 |
| 3,428,580 | 2/1969 | Nitzsche et al. | 521/154 |
| 3,516,951 | 6/1970 | Smith | 260/2.5 |
| 4,157,426 | 6/1979 | Hatanaka et al. | 521/154 |
| 4,189,545 | 2/1980 | Modic | 521/131 |
| 4,529,741 | 7/1985 | Bauman et al. | 521/99 |
| 4,547,529 | 10/1985 | Lee, et al. | 521/122 |
| 4,550,125 | 10/1985 | Lee et al. | 521/117 |

FOREIGN PATENT DOCUMENTS

| | | |
|---|---|---|
| 1185508 | 7/1959 | France . |
| 867619 | 5/1961 | United Kingdom . |
| 2065661 | 7/1981 | United Kingdom . |

OTHER PUBLICATIONS

U.S. patent application Ser. No. 929,250, filed 11/10/86 by David Pocknell, Entitled "Methods of Making Dressings".

U.S. patent application Ser. No. 929,252, Filed 11/10/86 by David Pocknell, Entitled "Method of Making Dressings".

*Primary Examiner*—Morton Foelak
*Attorney, Agent, or Firm*—Susan M. Cornwall

[57] ABSTRACT

The specification is directed to polysiloxane foams. There are disclosed compositions capable of curing at room temperature which comprise a hydroxypolysiloxane, an alkylhydrogen polysiloxane, a tin compound as catalyst and finely divided filler. According to the invention storage stability of these foam forming polysiloxane compositions is improved by use as filler of silica which has been pretreated to render is hydrophobic. The subject compositions may comprise two components which do not require individual mixing prior to mixing together of the components. The compositions may be packaged in any convenient manner. The compositions may be used for a variety of purposes, for example to provide medical dressings.

6 Claims, No Drawings

ORGANOSILOXANE FOAMS

BACKGROUND OF THE INVENTION

This invention is concerned with organosiloxane foams.

It has been proposed to employ two-part curable organosiloxane foam forming compositions for a variety of uses.

For example it has been proposed to use two-part, room temperature curable compositions to provide dressings for open granulating wounds. For example, G.B. Patent Specification No. 1 492 581 describes a process in which the two parts of the composition are mixed and then poured into an open wound where the composition foams and cures to provide an elastomeric foam dressing. Such compositions may comprise for example poly(dimethylsiloxane) and finely divided filler base or "part A", and a catalyst part or "part B" comprising catalyst material for promoting room temperature curing of the composition according to the scheme $\equiv$SiOH+HSi$\equiv\rightarrow\equiv$Si—O—Si$\equiv$+H$_2$. In this way, one may provide comfortable, non-adherent dressings conforming to the contours of the wound which are inter alia flexible, resilient, permeable to air and somewhat absorbent.

Such a procedure for producing dressings leads to a variety of advantages related to improved patient comfort e.g. resulting from the resilient non-adherent characteristics of the dressing and reduced care from specialist nursing staff e.g. due to the increased possibility for the patient to remove the dressing to permit washing and/or disinfecting of the wound and dressing, followed by replacement of the dressing.

While it is possible to take advantage of this proposal, the tendency of the filler to separate from the other components during storage resulting in the formation of a thick deposit in the part A during storage of the compositions employed has necessitated not only proper mixing together of the parts A and B but also thorough mixing of the part A prior to admixture with the part B. Thus, the step of mixing the part A of the composition just prior to use is a critical step in order to ensure that a suitably foamed, cured, uniformly resilient product is produced and in order to exploit the considerable advantages available by use of the process. When this step is not carried out adequately or at all (as may happen in practice) mediocre quality dressings result.

It is difficult to rectify improper mixing of curable compositions because very often the fact of improper mixing is not recognized until after the supposedly curing composition has been applied to its allotted position. After recognition of failure to provide a suitably cured mass it becomes desirable to remove the defective material, clean up the site and to achieve the desired result by correct application or by some other practice. Such remedial operations are troublesome and inconvenient and are especially so in those cases where the product is used to provide a treatment for an open wound for example on the human body.

SUMMARY OF THE INVENTION

It is an object of the present invention to provide an improved organopolysiloxane composition capable of curing to provide an elastomeric foam.

The present invention provides a composition comprising an organosilicon polymer including siloxane units providing a silicon-bonded hydroxyl group, an organosilicon polymer including siloxane units having a silicon-bonded hydrogen atom, a catalyst and finely divided filler material, the organosilicon polymers being such that they are capable of chemical reaction at room temperature in presence of the catalyst whereby hydrogen is evolved to cause the composition to foam and the composition becomes cured thus to provide a resilient foam characterized in that the composition consists essentially of (a) 100 parts by weight alpha, omega-di-hydroxy polysiloxane (hereinafter "α,ω-di-hydroxy polysiloxane") having a viscosity in the range 0.5 to 25 Pa.s (Pascal-seconds) at 25° C., (b) 5 to 35 parts by weight trialkylsiloxy end-blocked alkylhydrogen polysiloxane, (c) 0 to 60 parts by weight low molecular weight di-hydroxy polysiloxane, (d) 0 to 7 parts by weight of a crosslinking agent capable of combining with three or more hydroxy polysiloxane molecules, (e) 0 to 20 parts by weight of a monohydroxy silanol or siloxanol, (f) 5 to 35 parts by weight of finely divided filler which includes a major amount of silica which has been treated to render it hydrophobic, (g) 3 to 8 percent by weight of the ingredients (a) to (f) of a tin salt of a carboxylic acid as catalyst, optionally in admixture with material intended to provide propellant gas.

DETAILED DESCRIPTION OF THE INVENTION

Finely divided filler materials suitable for use in a composition according to the invention include those prepared by treatment of finely divided silica with organosilanes, organosiloxanes, organosilazanes or alkylsilanols. Suitable organosilanes include those represented by the general formula $(R)_aSi(X)_b$ in which each R represents a lower alkyl or aryl group for example a methyl group or a phenyl group, each X represents a hydroxyl group or a halogen atom for example Cl or Br, and each of a and b is 1, 2 or 3 and a+b=4. Examples of such materials include trimethyl monochlorosilane, dimethyl dichlorosilane and trimethyl monohydroxysilane. The hydroxysilanes may be produced for example by hydrolysis of appropriate alkyl disilazanes; for example the preferred filler material is a reaction product derived from silica and hexamethyldisilazane in presence of water. Suitable filler materials have a surface area between about 50 and about 300 m$^2$/g and preferred materials have a surface area between about 100 and about 250 m$^2$/g.

The hydrophobic fillers used in the present invention are produced in a separate operation, and then mixed with the other materials of the composition. If desired, the filler may include a minor amount of untreated, finely divided filler material in an amount which does not lead to undesirable settlement of the filler in the stored composition prior to curing and thereby defeat the purpose of the present invention. Suitable fillers include metal oxides, clays and silicas.

A composition according to the invention is curable in a short time at room temperature. For many purposes, a composition curable within a few minutes at temperatures in the range of about 15° C. to about 30° C. without application of heat is desirable. Tin compounds suitable for use in a composition according to the invention include tin salts of carboxylic acids and particularly the stannous salts of the more commonly available carboxylic acids. Examples of suitable materials are dibutyl tin dilaurate, stannous acetate, stannous napthenate, stannous benzoate, stannous sebacate, stannous succinate and stannous octoate.

In a composition according to the invention, the organosilicon polymer including siloxane units providing a silicon bonded hydroxyl group (hereinafter referred to as "hydroxy polysiloxanes") and the organosilicon polymer including siloxane units having a silicon bonded hydrogen atom (hereinafter referred to as "alkylhydrogen polysiloxane") are employed to provide both foaming and curing of the composition. The hydroxy polysiloxanes and alkyl-hydrogen polysiloxanes are selected so as to provide a composition curable at desired temperature in presence of the catalyst without application of external heating to provide foamed elastomeric product. Polysiloxanes suitable for use in the invention are known in the art and may be, for example, as described in G.B. patent specifications Nos. 798 669 and 867 619.

Suitable hydroxy polysiloxanes include polydiorganosiloxanes having siloxane units according to the general formula

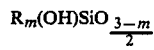

in which each R represents a lower alkyl group of 1 to 6 carbon atoms or phenyl group e.g. a methyl group and m is 1 or 2. The hydroxy polysiloxanes also comprise units

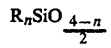

in which R is as referred to above and n has the value 1, 2 or 3. These materials are preferably liquids and are chosen so that their hydroxyl functionality is appropriate in relation to the degree of chain extension and crosslinking required during curing of the composition. In those cases where the alkylhydrogen polysiloxane includes many units having silicon bonded hydrogen atoms, we prefer to employ hydroxy polysiloxanes which are essentially difunctional i.e. $\alpha,\omega$-di-hydroxy polysiloxanes.

Suitable hydroxy polysiloxanes comprise at least a first $\alpha,\omega$-di-hydroxy polysiloxane having a viscosity at 25° C. of about 0.5 to 25 Pa.s, i.e. number average molecular weight of the order of about 20,000 to about 80,000. Preferred materials have viscosities of the order of about 1.5 to about 15 Pa.s at 25° C. and the most preferred materials have viscosities of about 1.8 to about 2.6 Pa.s. The preferred materials comprise, per molecule, primarily siloxane units according to the general formula $R_2SiO$ and two units according to the general formula $R_2(OH)SiO_{\frac{1}{2}}$. In the preferred materials, each R represents a methyl group. In preferred compositions according to the invention, the first $\alpha,\omega$-di-hydroxy polysiloxane thus provides polysiloxane chains of significant length and this is desirable in view of flexibility and elastomeric properties required of the product resulting from curing of the composition. If desired, comparatively "low molecular weight" short chained polyhydroxy polysiloxanes may also be included in the composition. These materials may be difunctional or of higher functionality and may have functional groups e.g. vinyl in addition to hydroxy groups. Suitable materials include $\alpha,\omega$-di-hydroxy polysiloxanes having up to twenty five dimethylsiloxane units in the molecular chain and di-hydroxy vinyl polysiloxanes.

Suitable organohydrogen polysiloxanes for use in a composition according to the invention include fluid polymers having siloxane units according to the general formula

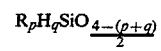

in which each R represents a lower alkyl group of 1 to 6 carbon atoms or phenyl group e.g. a methyl group, p is 0, 1 or 2, q is 1 or 2 and the sum of p and q is 1, 2 or 3. The alkylhydrogen polysiloxanes may also comprise units

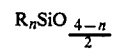

in which R is as referred to above and n has the value 1, 2 or 3. It will be appreciated that curing and foaming of the preferred composition are dependent on presence of appropriate quantities of the $\equiv$Si—OH and $\equiv$Si—H functionalities. In preferred compositions, which use $\alpha,\omega$-di-hydroxy polysiloxanes, I prefer that the alkyl hydrogen polysiloxane consists predominantly of units according to the general formula RHSiO and I prefer that each R represents a methyl group. Terminal groups of the alkylhydrogen polysiloxane are $R_3SiO_{178}$ units and are preferably trimethylsiloxy groups. The alkylhydrogen polysiloxanes are advantageously provided as a mixture of polysiloxanes of viscosity of the order of from about 0.001 to about 0.1 Pa.s, more preferably as a mixture of viscosity 0.001 to 0.05 Pa.s at 25° C.

In order to ensure curing of the composition to a foam of suitable properties, it is necessary to ensure that chain extending and crosslinking reactions proceed at a rate commensurate with permitting liberated hydrogen gas to lead to a foamed structure and to ensure that a suitable degree of crosslinking is achieved between polymer molecules in order to achieve desired resilience and cell characteristics. To this end it is desirable to include in the composition appropriate quantities of higher functional materials as crosslinking agents. Suitable "crosslinking agents" include materials having three or more groups per molecule which react effectively to combine with the hydroxy polysiloxane or alkylhydrogen polysiloxane and which react at appropriate speed to enable formation of a shape retaining resilient foam. I prefer to include an alkoxysilane and/or a condensation product thereof capable of combining with 3 or more hydroxy polysiloxane molecules with release of the corresponding alcohol of the alkyl radicals, e.g. n-propylorthosilicate, methyl trimethoxy silane and ethyl polysilicate.

Compositions according to the invention preferably include monofunctional hydroxy silicon compounds effective as chain terminators. Such materials influence the structure of foams formed by use of the composition. Their use is highly preferred where predominantly "open cell" foams are desired. Suitable monofunctional hydroxy compounds include triorganosilanols and organosiloxanols which may be for example short chain siloxanes having for example up to about 25 siloxane units per molecule and having a terminal or pendant hydroxyl group, or a material of the general formula $R_3SiOH$ where each R is as above and may be for example a lower alkyl group e.g. a methyl group, or a phenyl group. Examples of such materials include

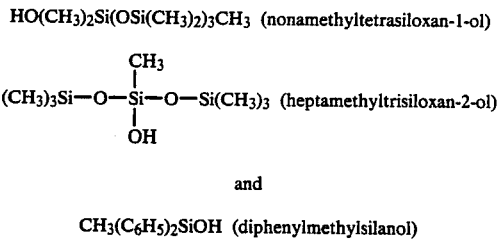

HO(CH$_3$)$_2$Si(OSi(CH$_3$)$_2$)$_3$CH$_3$ (nonamethyltetrasiloxan-1-ol)

and

CH$_3$(C$_6$H$_5$)$_2$SiOH (diphenylmethylsilanol)

I prefer to formulate the composition to obtain an elastomeric foam of density between about 120 and about 210 kg/m$^3$ within 3 minutes of mixing the ingredients at room temperature. The various preferred materials may be used for example in amounts within ranges as follows:

| Material | Parts by Weight | |
|---|---|---|
| | Formulation According to the Invention | Preferred Formulation According to the Invention |
| α,ω-di-hydroxy polysiloxanes of viscosity 1.8 to 2.6 Pa.s | 100 | 100 |
| Low mw dihydroxy polysiloxane | 0 to 60 | 5 to 20 |
| Alkylhydrogen polysiloxane | 5 to 35 | 10 to 30 |
| Crosslinking agent | 0 to 7 | 3 to 5 |
| Chain terminator R$_3$SiOH | 0 to 20 | 5 to 15 |
| Filler | 5 to 35 | 5 to 15 |

Catalyst is added in an amount equal to 3 to 8% by weight based on the total weight of the above ingredients.

Compositions according to the invention are packaged in such a way that the desired reactions do not take place until the desired time. They may comprise one or more parts, but preferably are packaged in two or more parts at least one of which comprises said filler. Preferred compositions comprise two parts and cure quickly at room temperature when all the ingredients are mixed together. I prefer to employ a part A or elastomer part containing the polysiloxanes, filler etc. and a part B or catalyst part comprising the catalyst alone. The two parts A and B may be packaged in quantities appropriate for preparation of single or multiple mixes per package as desired. Plastics, metal or glass, moisture proof containers may be suitable for this purpose.

Compositions according to the invention packaged as an elastomer part or part A comprising all the various ingredients except the catalyst, and a part B comprising the catalyst alone demonstrate no separation of filler or any other physical instability of the elastomer part over periods of several months. Compositions according to the invention after prolonged storage of the two parts can be mixed, without resort to premixing the elastomer part, and preferred compositions can be used to provide elastomeric foams of good flexibility and foam structure in less than five minutes after mixing. Due to the elimination of the need to mix the elastomer part after storage and prior to mixing with the catalyst, the possibility is opened to package the elastomer part in packs (i.e., containers) in which the possibility for thorough mixing of the elastomer part is available with difficulty or not at all.

Preferably the part or parts of the composition containing the filler is packaged in a container from which it may be dispensed by means of propellant gas. For such packaging, at least one of the parts of the composition should be packaged together with material which is capable of providing a propellant gas. For example a component part of a composition according to the invention may be packaged in admixture with propellant material or a component part may be contained within a membrane which is caused to contract about the component under the influence of propellant gas when required. Preferably the composition is packaged with ingredients (a) to (f) contained in a membrane within a can which is caused to contract about the composition when required, and the ingredient (g) is packaged in admixture with material intended to provide propellant gas in the manner of an aerosol. For many purposes, the liquefied gases known for use in aerosols are suitable as propellants, including hydrocarbons for example methane, ethylene, ethane, propane, neopentane and the many halogenated hydrocarbons especially the fluorinated hydrocarbons, for example methyl fluoride, trifluoromethane, monochlorodifluoromethane and dichlorodifluoromethane. However, for some medical uses, care should be taken to select a propellant which does not lead to unnecessary discomfort for the patient due to prolongation of the time required for curing of the product or undesirable cooling effects.

The invention is illustrated herein by reference to example compositions capable of curing to provide resilient foam materials suitable for use as medical dressings but is applicable to products for other uses including dental dressings and sound and heat insulating mouldings.

In order that the invention may be more fully understood there now follows a description of examples compositions provided by the invention and illustrative thereof.

Each of the illustrative compositions is a composition in two parts A and B capable of curing at room temperature when admixed in prescribed proportions to provide a resilient cured polysiloxane foam mass by reaction between silicon bonded hydroxyl groups and silicon bonded hydrogen atoms of polysiloxanes, comprising polysiloxane material, catalyst and finely divided filler material comprising silica which has been pretreated to render it hydrophobic.

The illustrative compositions comprised parts A made by mixing the following materials in the amounts by weight shown:

| Material | Illustrative Composition | | | | |
|---|---|---|---|---|---|
| | 1 | 2 | 3 | 4 | 5 |
| α,ω-Hydroxy polysiloxane 1 | 100 | 100 | 100 | 100 | 50 |
| α,ω-Hydroxy polysiloxane 2 | — | — | — | — | 50 |
| Low molecular weight hydroxy siloxane 1 | 10 | 10 | 50 | 50 | 10 |
| Low molecular weight hydroxy siloxane 2 | — | — | — | — | 15 |
| Alkylhydrogensiloxane | 10 | 20 | 10 | 10 | 10 |
| Crosslinking agent | 4 | 4 | 4 | 4 | 4 |
| Chain terminator | | | | | |
| diphenylmethyl silanol | 10 | 10 | — | — | — |
| vinyldimethyl silanol | — | — | 5 | — | — |
| heptamethyltrisiloxan-2-ol | — | — | — | — | 7.5 |
| nonamethyltetrasiloxanol | — | — | — | 10 | — |
| Filler | 10 | 10 | 15 | 15 | 10 |

The α,ω-hydroxy polysiloxanes 1 and 2 used were mixtures of α,ω-di-hydroxy polydimethylsiloxanes having viscosities at 25° C. of about 2 Pa.s and about 13.5 Pa.s respectively (i.e. a number average molecular weight 21000 and 40,000 respectively) containing minor amounts of cyclic polydimethylsiloxanes.

The alkylhydrogen siloxane used was a mixture of trimethylsiloxy end-blocked methylhydrogen polysiloxanes having a viscosity at 25° C. of about 0.02 to about 0.04 Pa.s and an SiH content (as H) of about 1.6%.

The low molecular weight hydroxy siloxane 1 comprised dihydroxy polydimethylsiloxanes having 1 to 23 or more siloxane units. The low molecular weight hydroxy siloxane 2 used comprised dihydroxy polydimethyl polymethylvinylsiloxanes having an average of about 3.5 dimethyl siloxane units per molecule and about 2 methylvinyl siloxane units per molecule.

The crosslinking agent used in compositions 1 to 4 was n-propyl orthosilicate.

The filler used was Wacker H2000 which is understood to have a surface area of 170±30 m²/g and a silica content of not less than 97% and to be a material prepared by treatment of finely divided silica and hexamethyldisilazane to provide a a hydrophobic silica.

Each of the illustrative compositions was aged at 62° C. for eight weeks. There was no evidence of separation of any of the compositions. Each of the illustrative compositions, when mixed with 6% (by weight of the illustrative compositions) stannous octoate foamed within five minutes to provide a substantially open cell foam which cured to a resilient cellular product.

Other modifications and variations in the method of the present invention will become apparent to those skilled in the art from an examination of the above specification and drawings. Therefore, other variations and modifications of the present invention may be made which fall within the scope of the following claims even though they were not specifically discussed above.

That which is claimed is:

1. A foamable composition comprising an organosilicon polymer including siloxane units providing a silicon-bonded hydroxyl group, an organosilicon polymer including siloxane units having a silicon-bonded hydrogen atom, a catalyst and finely divided filler material, the organosilicon polymers being such that they are capable of chemical reaction at room temperature in presence of the catalyst whereby hydrogen is evolved to cause the composition to foam and the composition becomes cured thus to provide a resilient foam characterised in that the foamable composition consists essentially of (a) 100 parts by weight α,ω-di-hydroxy polysiloxane having a viscosity in the range 0.5 to 25 Pa.s at 25° C., (b) 5 to 35 parts by weight trialkyl-siloxy endblocked alkylhydrogen polysiloxane, (c) 0 to 60 parts by weight of a low molecular weight di-hydroxy polysiloxane containing no more than 25 R₂ SiO units wherein R represents a lower alkyl group of 1 to 6 carbon atoms or a phenyl group, (d) 0 to 7 parts by weight of a crosslinking agent capable of combining with three or more hydroxy polysiloxane molecules, (e) 0 to 20 parts by weight of a monohydroxy silanol or siloxanol, (f) 5 to 35 parts by weight of finely divided filler which includes a major amount of silica which has been treated to render it hydrophobic, (g) 3 to 8 percent by weight of the ingredients (a) to (f) of a tin salt of a carboxylic acid as catalyst, optionally in admixture with material intended to provide propellant gas.

2. A foamable composition according to claim 1 further characterized in that said (a), (c) and (e) are composed of one or more siloxane units according to the general formula

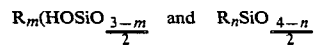

in which each R represents a lower alkyl group of 1 to 6 carbon atoms or a phenyl group and n has the value of 1, 2 or 3; said (c) contains no more than 25 R₂SiO units; said (b) is composed of a mixture of trialkyl-siloxy endblocked alkylhydrogen polysiloxanes having a viscosity of from 0.0001 to 0.1 Pa.s at 25° C. and are composed of endblocking siloxane units according to the general formula R₃SiO½ and a combination of R₂SiO and RHSiO units where the majority of the latter two siloxane units are RHSiO units; and said (d) is a crosslinking agent selected from the group consisting of an alkoxysilanes, an organosilane or a condensation products of alkoxysilane, and mixtures of both wherein each such crosslinking agent contains at least three silicon-bonded alkoxy radicals.

3. A foamable composition according to claim 2 wherein there is present from 5 to 20 parts of (b), from 10 to 30 parts of (c), from 3 to 5 parts of (d), from 5 to 15 parts of (e) and from 5 to 15 parts of (f).

4. A foamable composition according to claim 1 further characterised in that the filler consists of a product of the treatment of silica with hexamethyl disilazane and has a surface area between about 100 and 250 m²/g.

5. A foamable composition according to claim 4 further characterized in that said (a), (c) and (e) are composed of one or more siloxane units according to the general formula

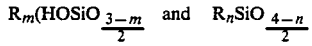

in which each R represents a lower alkyl group of 1 to 6 carbon atoms or a phenyl group and n has the value of 1, 2 or 3; said (c) contains no more than 25 R₂SiO units; said (b) is composed of a mixture of trialkyl-siloxy endblocked alkylhydrogen polysiloxanes having a viscosity of from 0.0001 to 0.1 Pa.s at 25° C. and are composed of endblocking siloxane units according to the general formula R₃SiO½ and a combination of R₂SiO and RHSiO units where the majority of the latter two siloxane units are RHSiO units; and said (d) is a crosslinking agent selected from the group consisting of alkoxysilanes, an organosilane or a condensation products of an alkoxysilane, and mixtures of both wherein each such crosslinking agent contains at least three silicon-bonded alkoxy radicals.

6. A foamable composition according to claim 5 wherein there is present from 5 to 20 parts of (b), from 10 to 30 parts of (c), from 3 to 5 parts of (d), from 5 to 15 parts of (e) and from 5 to 15 parts of (f).

* * * * *